US009246589B2

(12) United States Patent
Koonen et al.

(10) Patent No.: US 9,246,589 B2
(45) Date of Patent: Jan. 26, 2016

(54) TWO-DIMENSIONAL OPTICAL BEAM STEERING MODULE

(71) Applicant: Technische Universiteit Eindhoven, Eindhoven (NL)

(72) Inventors: Antonius Marcellus Jozef Koonen, Nuenen (NL); Peter G. M. Baltus, Weert (NL); Antonio Liotta, Dordrecht (NL)

(73) Assignee: Technische Universiteit Eindhoven, Eindhoven (NL)

( * ) Notice: Subject to any disclaimer, the term of this patent is extended or adjusted under 35 U.S.C. 154(b) by 28 days.

(21) Appl. No.: 14/372,805

(22) PCT Filed: Jan. 18, 2013

(86) PCT No.: PCT/EP2013/050923
§ 371 (c)(1),
(2) Date: Jul. 17, 2014

(87) PCT Pub. No.: WO2013/107853
PCT Pub. Date: Jul. 25, 2013

(65) Prior Publication Data
US 2014/0363170 A1  Dec. 11, 2014

Related U.S. Application Data

(60) Provisional application No. 61/588,985, filed on Jan. 20, 2012.

(51) Int. Cl.
*H04B 10/00* (2013.01)
*H04B 10/2575* (2013.01)
(Continued)

(52) U.S. Cl.
CPC ...... *H04B 10/25753* (2013.01); *H04B 10/1149* (2013.01); *H04B 10/2575* (2013.01); *G02B 6/34* (2013.01)

(58) Field of Classification Search
CPC .............. H04B 10/25753; H04B 10/1149; H04B 10/2575; G02B 6/34
See application file for complete search history.

(56) References Cited

U.S. PATENT DOCUMENTS 3,721,410 A * 3/1973 Anspacher ............... F41G 3/02
178/76
5,424,859 A  6/1995 Uehara et al.
(Continued)

FOREIGN PATENT DOCUMENTS

EP      0629881    12/1994
EP      1981183    10/2008

OTHER PUBLICATIONS

Kavehrad (2010). Sustainable Energy-efficient Wireless Application using light. IEEE Communications Magazine Dec. 2010, pp. 66-73.

*Primary Examiner* — Danny Leung
(74) *Attorney, Agent, or Firm* — Lumen Patent Firm

(57) ABSTRACT

An interference-free communication system having a central communication controller (CCC) with a wavelength-tunable light source that emits a tunable wavelength optical data signal, and controls the wavelength-tunable light source by conditioning, modulation and wavelength-tuning, the CCC includes a signal-transparent optical crossconnect and fiber optic network, a pencil-radiating antenna (PRA) that is a passive 2-dimensional diffractive module is coupled to the wavelength-tunable light source via the fiber optic network, the crossconnect routes the optical data signal to the PRA, the optical data signal is transmitted through a confined optical pencil beam, the PRA deflects the pencil beam in 2 angular dimensions as a function of a wavelength of the pencil beam, the deflected pencil beam is disposed for communication with an opto-electronic communication device, and a radio return channel that provides upstream communication from the communication device to the CCC includes a lack-of-connection communication between the communication device and the CCC.

13 Claims, 8 Drawing Sheets

(51) Int. Cl.
*H04B 10/114* (2013.01)
*G02B 6/34* (2006.01)

(56) References Cited

U.S. PATENT DOCUMENTS

| | | | | |
|---|---|---|---|---|
| 5,471,211 A * | 11/1995 | Randall | ................ | G01S 13/003 342/26 D |
| 6,377,204 B1 * | 4/2002 | Wurman | ................ | G01S 13/003 342/147 |
| 6,606,175 B1 | 8/2003 | Sampsell et al. | | |
| 2011/0002694 A1 * | 1/2011 | Maejima | ............ | H04B 10/2581 398/143 |
| 2011/0045768 A1 * | 2/2011 | Keerthi | ................ | H01Q 21/061 455/39 |
| 2012/0001734 A1 | 1/2012 | Gerber et al. | | |
| 2012/0099856 A1 * | 4/2012 | Britz | ...................... | H04B 10/60 398/26 |
| 2012/0308235 A1 * | 12/2012 | Pusarla | ................ | H04B 10/112 398/79 |
| 2014/0161466 A1 * | 6/2014 | Riza | ................... | H04B 10/1143 398/119 |
| 2014/0363170 A1 * | 12/2014 | Koonen | ............. | H04B 10/1149 398/115 |

\* cited by examiner $$\Delta\lambda_{FSR} = \lambda^2 / (\Delta L + d \sin\varphi + \lambda)$$

(b)

(a)

(b)

*(c)*

TWO-DIMENSIONAL OPTICAL BEAM STEERING MODULE

CROSS-REFERENCE TO RELATED APPLICATIONS

This application is a 371 of PCT/EP2013/050923 filed on Jan. 18, 2013. PCT/EP2013/050923 filed on Jan. 18, 2013 claims the benefit of U.S. Provisional application 61/588,985 filed on Jan. 20, 2012.

FIELD OF THE INVENTION

The present invention relates generally to wireless communication. More particularly, the invention relates to direct optical pencil beams for interference-free ultra-high capacity wireless communication.

BACKGROUND OF THE INVENTION

Wireless users will be carrying ever more devices with them, evolving to the era of hyperconnectivity, in which the number of devices connected to communication networks and the internet will exceed the number of persons by several orders of magnitude; e.g., it is predicted that every person may carry 50-60 devices in a few years time. This phenomenon is also known as "The internet of things". Wireless communication technology is essential for this. Although the hyperconnected world is extremely powerful in its conception, on the road towards it serious hurdles are put by the capabilities of radio-based wireless technologies. Wireless data rates, supported by subsequent standards, have shown impressive growth in the recent past; FIG. 1 shows how data rates have doubled each 18 months in the past decennia. With present radio techniques, this trend cannot be sustained, and radio techniques will reach their physical limits as the radio spectrum gets overcrowded and wireless devices start interfering with each other as the radio emission patterns will overlap. Radio beam steering by means of smart segmented antennas may alleviate this interference, but radio technologies do not allow tight confinement of the beams. Furthermore, due to the radiated fields which propagate as (part of) an extending sphere, the attenuation factor increases with the square of the distance, thus limiting their reach.

Another reach-limiting factor is the atmospheric absorption of radio frequencies, aggravated by e.g. humidity.

What is needed is a wireless system that overcomes the radio technique barriers.

SUMMARY OF THE INVENTION

To address the needs in the art, an ultra-high capacity interference-free communication system is provided that includes a central communication controller (CCC), where the CCC includes a wavelength-tunable light source that emits an optical data signal, where the optical data signal is a tunable wavelength, where the CCC controls the wavelength-tunable light source, where the control of the wavelength-tunable light source includes conditioning, modulation and wavelength-tuning of the optical data signal, and where the CCC includes a signal-transparent optical crossconnect. The invention further includes a fiber optic network, where the wavelength-tunable light source is coupled to the fiber optic network, a pencil-radiating antenna (PRA), where the PRA comprises a passive 2-dimensional diffractive module, where the PRA is coupled to the fiber optic network, where the PRA is coupled to the wavelength-tunable light source via the fiber optic network, where the signal-transparent optical crossconnect routes the optical data signal to the PRA, where the optical data signal is transmitted through a confined optical pencil beam, where the PRA deflects the confined optical pencil beam in 2 angular dimensions as a function of a wavelength of the confined optical pencil beam, where the deflected optical pencil beam is disposed for communication with an opto-electronic communication device, and a radio return channel, where the radio return channel carries a data signal from the opto-electronic communication device to the CCC and in case the optical signal is not established carries a lack-of-connection communication between the opto-electronic communication device and the CCC.

According to one aspect of the invention, the radio return channel is realized using radio-over-fiber techniques by a radio-over-fiber unit located at the PRA. In one aspect, the radio-over-fiber unit is powered through the PRA according to a photovoltaic conversion device.

In another aspect of the invention, each optical data signal is transmitted by a unique wavelength, where the unique wavelength includes an independent communication path from the CCC to an opto-electronic communication device.

In a further aspect of the invention, the optical pencil beam includes an eye-safe wavelength.

According to one aspect of the invention, the opto-electronic communication device includes a photodetector. In one aspect, the photodetector includes a 2-dimensional photodetector array and a light collecting lens system.

In yet another aspect of the invention, the PRA includes two consecutive orthogonal diffractive stages, where in a first diffractive stage the optical pencil beam is diffracted in one angular direction $\phi$ as a periodic relatively fast-varying function of the wavelength $\lambda$ (where this function has a period $\Delta\lambda_{FSR}$, which is its so-called free spectral range), where in a second diffractive stage the optical pencil beam is diffracted in a second angular direction $\psi$ as a relatively slowly-varying function of $\lambda$, where the angular direction $\psi$ is orthogonal to the angular direction $\phi$.

In a further aspect of the invention, the 2-dimensional diffractive module includes two crossed diffraction gratings with different grating pitches, where a first diffractive grating provides a relatively high angular dispersion $d\phi/d\lambda$ and relatively small $\Delta\lambda_{FSR}$. In an other aspect the 2-dimensional diffractive module is a 2×2 array composed of an array of identical grating modules with relatively high angular dispersion $d\phi/d\lambda$ and relatively small $\Delta\lambda_{FSR}$, driven by a grating module having an orthogonal lower angular dispersion and larger free spectral range.

According to another aspect of the invention, the CCC includes an autonomic management system, where the autonomic management system activates and accurately steers the optical pencil beam upon demand from the electronic communication device, where the autonomic management system assures that a user is not at risk of eye damage from the optical pencil beam within an optical beam steering area. In one aspect, the autonomic management system includes modules that include beam steering control, control of signal routing according to optical crossconnect, context monitoring, or policy-based management and control system.

In a further aspect of the invention, at a start-up of locating the optical pencil beam to the electronic communication device, the width of the optical pencil beam is enlarged by a wavelength dithering unit in the CCC, where the widened optical pencil beam is reduced upon an established connection.

DETAILED DESCRIPTION

Figure 1:
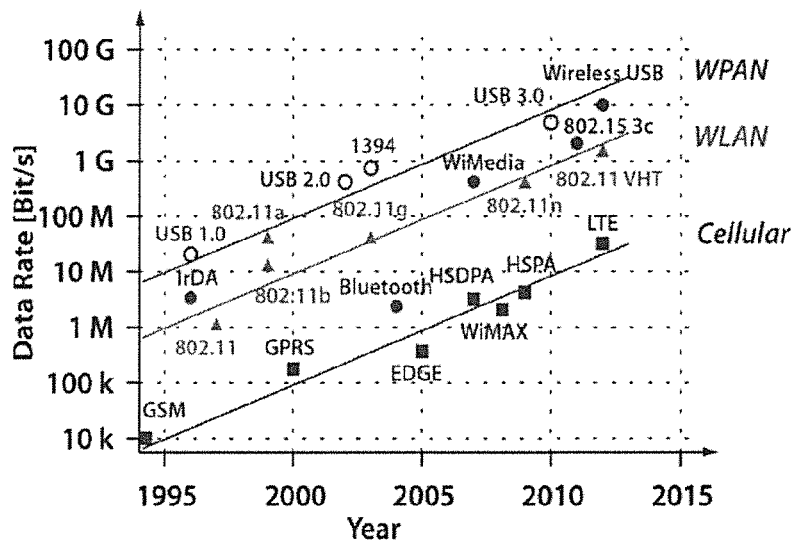
FIG. 1 shows a graph of the growth in wireless data rates according to Edholm's law.

On the other hand, optical communication technology has reached a high level of sophistication. The matured digital fiber optic technologies use infrared optical carrier wavelengths in the 1.3 μm region and the 1.5 μm region, representing carrier frequencies in the order of 200 THz. The optical spectrum available around these carriers can support a huge bandwidth, orders of magnitude beyond what can be offered in the radio spectrum. As such, optical carriers can transport huge data rates; with optical time division multiplexing techniques, speeds exceeding 1 Tbit/s have been achieved in a single wavelength channel. By wavelength division multiplexing, high speed data can be transported in a number of channels in parallel, thus multiplying the capacity of a communication link even into the tens of Tbit/s (a recent record in the laboratory stands at 69.1 Tbit/s with a spectral efficiency of 6.4 bit/s/Hz).

According to one embodiment of the invention, an optical free-space communication system is provided that is capable of increasing the capacity drastically by a two-fold gain: 1) by providing an orders of magnitude higher data capacity per user due to the ultra-high optical carrier frequencies, and 2) by reducing drastically the interference between the users due to the high optical free-space beam confinement, thus allowing a much higher user density. This optical free-space communication system using directed pencil beams also provides large power savings as it confines the light beams and only directs them to the opto-electronic devices which need data communication.

According to one embodiment of the invention, narrowly confined optical light beams are used in the optical free-space communication system. The optical light beams (optical pencil beams) are accurately directed to the users' devices, and track them when they are moving.

According to a further embodiment of the invention, an optical fiber network is provided throughout a users' environment. This fiber network acts as a flexible backbone network for bringing the optical data signals to the proper user cells, where the data signals are brought to the users in the form of wireless optical pencil beams. According to a further embodiment, signal-transparent optical routing techniques are employed by use of a signal-transparent optical crossconnect in the central control node of the network, which ensures that the signals are delivered in the right cells. Moreover, all the signal conditioning, translation, wavelength-tuning and modulation processes are hosted in this central control node, from where the communication with the users is established by use of dynamic signal routing in the optical crossconnect and signal transport to/from the cells via the backbone fiber network (by transferring the optical data signals from the CCC node to the opto-electronic device via the fiber network and the optical pencil beam, and transferring the radio data signals from the opto-electronic device via a radio wave, a radio-over-fiber unit at the PRA and the fiber network to the CCC). In another embodiment, the invention provides intelligent autonomic network management and control (NM&C) techniques, which from the central location are governing the signal routing as well as the optical beam steering in each user cell. The NM&C system also discovers the location and the service requirements of the users, and subsequently has to take the right actions to condition the data signals and direct them to the appropriate places.

The current invention addresses a challenging field of wireless optical communication for in-building applications. The invention provides adaptively steered infrared optical pencil beams that are seamlessly combined with a flexibly routed optical fiber network. The current invention provides a breakthrough in wireless communication, both in terms of offering ultra-high capacity per user and of interference-free communication to many individual closely-spaced users. Its orchestration via autonomic management techniques facilitates real-time, resource-intensive services within an agile, self-configuring system. Overall, the network capacity increases by several orders of magnitude with respect to what is possible in radio communications. Also the power consumption is drastically decreased to by the confined and well-directed nature of the pencil light beams. Moreover, the beam-steering 2-dimensional diffractive module (the PRA) is a fully passive module, which does not require local powering.

Scientific challenges created by the required fast accurate infrared optical beam steering under remote optical control are overcome by two-dimensional steering using passive optical modules in the rooms (cells) and fast wavelength-tunable optical sources in a centralized unit. Accurate localization of the user devices is provided by use of advanced radio techniques, such as radio correlation techniques. Furthermore, autonomous discovery of the location and nature of the network's resources, and of the location and capabilities of the users' devices are provided, where the match is made between the available resources and the user requirements. According to one embodiment, the invention uses autonomic networks for the management and control of the hybrid optical/radio wired-wireless system. The current invention moves beyond conventional control theory, which is not able to address the complexity and non-linearity present in the system of the current invention, and does not provide the required responsiveness and accuracy. The control system of the current invention benefits from fuzzy logic, which can handle multiple input/output and does not require a mathematical model of the controlled system, and machine learning to deal with the new types of perturbations generated by the emerging applications.

The current invention combines novel free-space optical communication techniques with techniques for intelligent autonomic signal routing through an optical fiber backbone network and for advanced radio communication, in a powerful blend which can realize a giant step forward in wireless communications, not realized with a single technology.

According to one embodiment, the invention deploys optical, narrowly confined, beams. Light beams have orders of magnitude higher carrier frequency than radio waves, and hence a fundamentally much higher capacity. Moreover, they can be tightly confined and thus can avoid interference with other beams, under the assumption that these beams can be accurately directed to their destinations, and keep to be well-directed when the destination devices move. The tight confinement and accurate directioning also yield significant power savings. According to one embodiment, the invention deploys the narrowly confined optical pencil beams aided by fast beam steering for ultra-high capacity interference-free communication, intelligent signal routing through an optical fiber backbone network, advanced radio techniques for accurate device localization, and an autonomic network management and control system for the tracking the users, for overall routing of services and for service delivery tailoring. As the user's devices are portable and change location, the system finds the devices autonomously, recognizes their characteristics and service needs.

Narrowly-confined optical pencil beams are provided for communication to the individual user devices within a users' cell, according to one embodiment of the current invention. Such beams are extremely directive, and thus multiple beams can be used to address spatially separated devices without interference. Novel free-space beam steering techniques over two angular dimensions are provided by the current invention.

Figure 2:
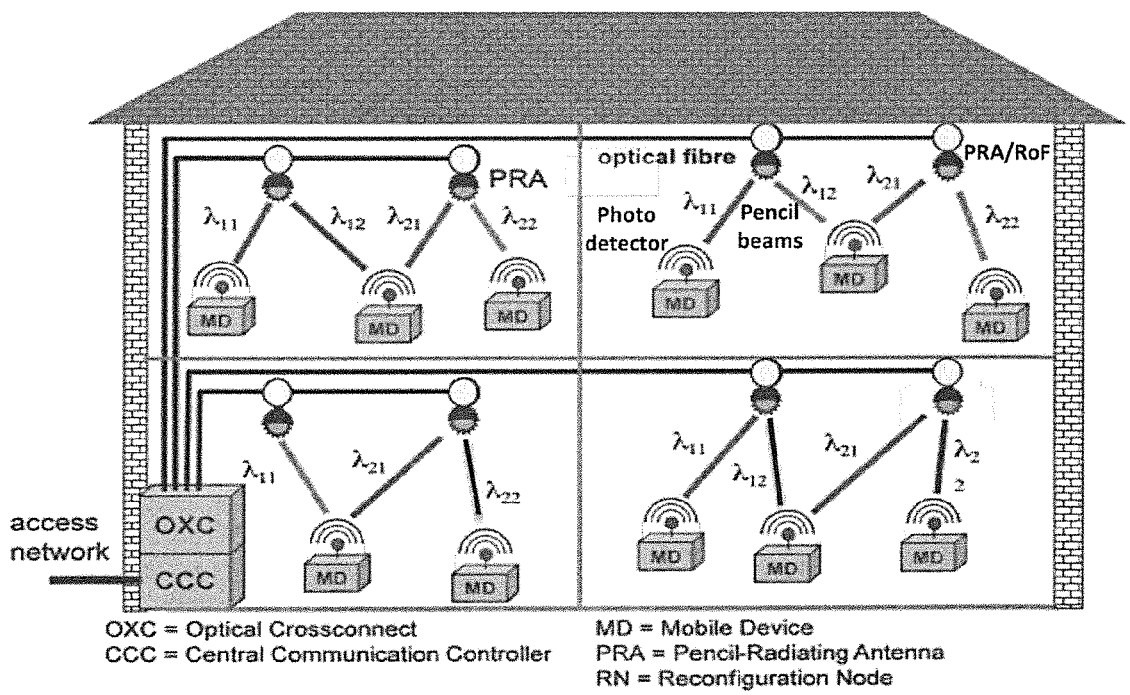
FIG. 2 shows free-space high-capacity wireless communication by multi-wavelength optical pencil beams, according to one embodiment of the invention.

According to another embodiment, the current invention uses wavelength-controlled beam steering, by applying a remote wavelength-tunable light source coupled via a fiber network to a passive 2-dimensional diffractive module. At the light source, the high-speed data signal is modulated on an optical carrier with a wavelength, which can be diligently tuned. The fiber network backbone carries this optical signal to the appropriate user cell, in which a 2-dimensional diffractive module emits the optical signal as a narrowly confined optical pencil beam and deflects it in 2 angular dimensions as a function of the wavelength of the signal. As an example, for the case where the user cells are rooms inside a building, one embodiment of the invention is shown in FIG. 2. The various light sources operating at different wavelengths are hosted in the Central Communication Controller (CCC), from which a fiber network selectively routes—via its routing nodes (RN-s)—the signals to the various user cells. In each cell, a pencil-radiating antenna (PRA) contains the fully passive, wavelength-controlled beam steering function. By feeding multiple signals, each with a different wavelength, via the fiber network to the PRA, multiple pencil beams emerge at different angles from that PRA. Thus a multitude of devices in a user cell can be served from a single PRA. Each wavelength constitutes an independent communication path from the CCC all the way via the fiber network and free space to a user device. This path is fully transparent to any signal format, and thus can address each device with a service, which is fully tailored to the capabilities of the device and the service demands of his user. At the light sources in the CCC, the wavelengths need to be set carefully such that the pencil beams are directed accurately to the respective user mobile devices (MD-s) in the user cell. For example, a PRA may be mounted at the ceiling of the room, from where it can address the relevant user area. Eye-safe wavelengths (above 1.4 μm) are to be used.

As a single optical beam may be obstructed, multiple optical pencil beams are deployed within a room, which are emitted from multiple PRA-s in the room as shown in FIG. 2, in combination with a photodetector in the user device. These multiple PRA-s are also used for device localisation. After loosing connection by the optical beam from one PRA, the device issues a lack-of-connection message via the radio return channel and the NM&C system will re-establish a connection from an other PRA to the device by starting again a device localisation and beam steering procedure, according to one embodiment. The system recalculates from previous location data the relative position of the device with respect to the new PRA to speed-up the localization process.

Figure 3:
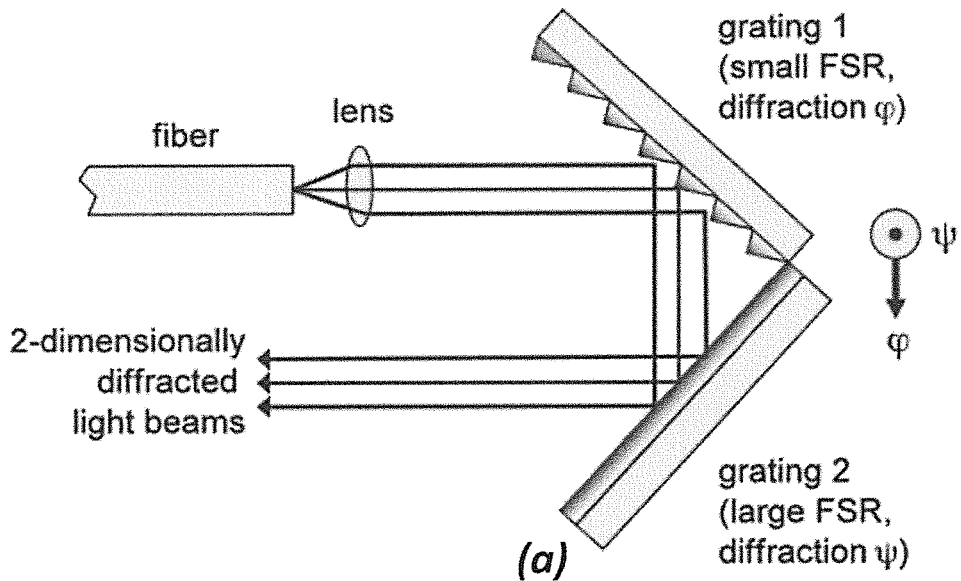
FIGS. 3a-3b show two-dimensional diffractive modules, according to some exemplary embodiments of the invention.
Figure 3:
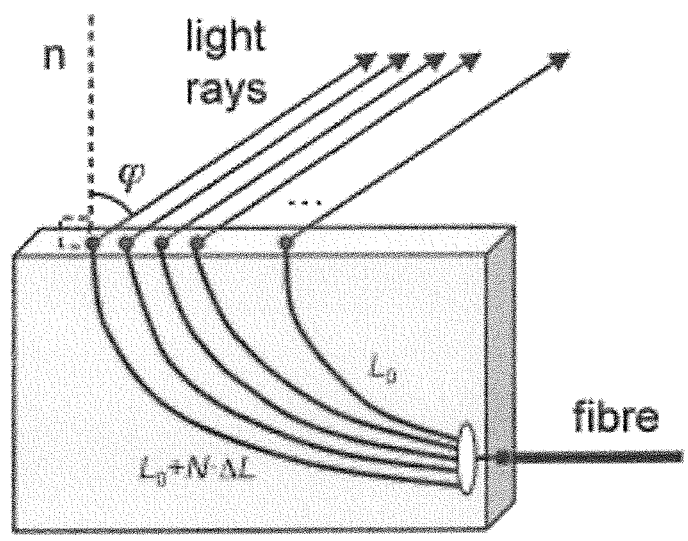

The wavelength-controlled beam steering embodiment requires that the beam is steered in two orthogonal angular directions ($\phi$, $\psi$) while only changing the wavelength $\lambda$ of the light beam. For that, a passive optical module is employed, which has two consecutive orthogonal diffractive stages. In the first stage, the beam is diffracted in one angular direction $\phi$ as a periodic fast-varying function of the wavelength $\lambda$ (so returning to the same angle $\phi_0$ when $\lambda$ has increased by $\Delta\lambda_{FSR}$, the Free Spectral Range). In the second stage, the beam is diffracted as a slow function of $\lambda$. Such 2-dimensional diffractive module may in principle be composed of two crossed diffraction gratings with different grating pitches, as shown in FIG. 3a. Thus by tuning the wavelength over multiple FSR's, each spot in the user cell can be addressed, like scanning from left-to-right line-by-line the characters on a page. The first grating device needs to have a high angular dispersion $d\phi/d\lambda$ and small $\Delta\lambda_{FSR}$. In one embodiment, a planar integrated waveguide array is used as shown in FIG. 3b, where by increasing the path length difference between the neighbouring waveguides, its angular dispersion is made high and its $\Delta\lambda_{FSR}$ small. The planar integrated waveguide array can be realized in silica glass, or in an indium-phosphide substrate.

Figure 4:
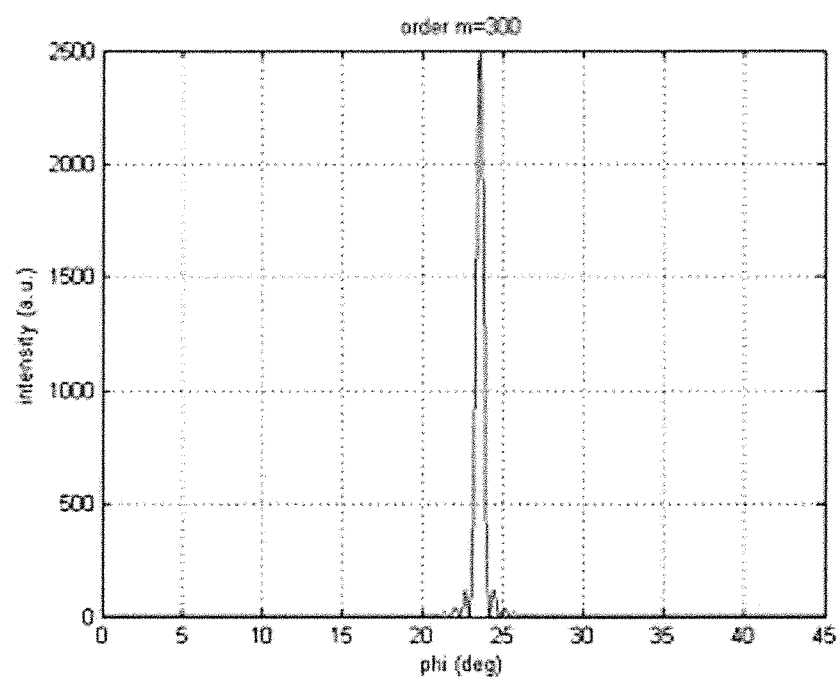
FIGS. 4a-4c show examples of performance of grating 1 (grating design parameters: N=50 emitter points, spaced by d=3 μm, ΔL=450 μm), where 4a shows light intensity versus angle φ at λ=1.504 μm, and 4b shows angle φ of intensity maximum versus wavelength λ, according to some exemplary embodiments of the invention.
Figure 4:
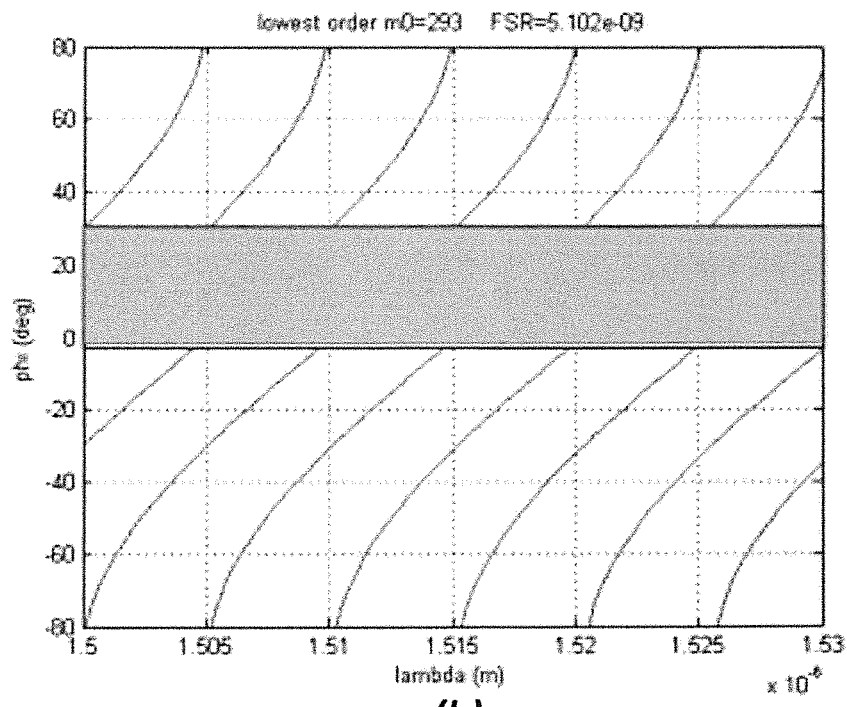
Figure 4:
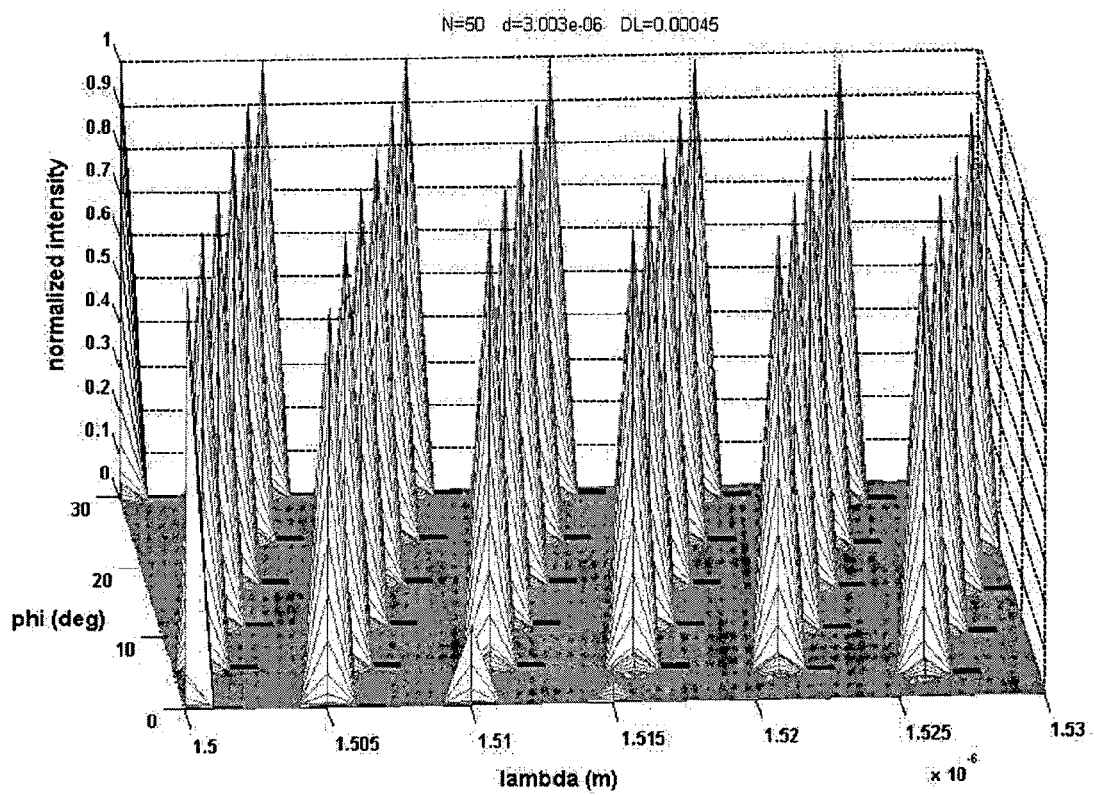

FIGS. 4a-4c show an example of the angular dispersive performance of the grating structure shown in FIG. 3b. This performance has been calculated assuming that the grating has N=50 emitter points, which are spaced by d=3 μm, and that the differential length $\Delta L$=450 μm. The intensity of the diffracted beam as a function of the emission angle $\phi$ and wavelength $\lambda$ can be derived as $$I(\varphi, \lambda) = \left|\frac{E_{tot}}{E_0}\right|^2 = \left[\frac{\sin\left(N \cdot \frac{\pi}{\lambda}(d\sin\varphi + \Delta L)\right)}{\sin\left(\frac{\pi}{\lambda}(d\sin\varphi + \Delta L)\right)}\right]^2$$

FIG. 4a shows the narrow intensity profile of the light beam versus the emission angle $\phi$ at a wavelength $\lambda$=1.504 μm. FIG. 4b shows how the intensity maximum of this beam is angularly shifted over the angle $\phi$ when the wavelength $\lambda$ is varied from 1.50 μm to 1.53 μm; 9 traces are shown, and each trace corresponds with a particular integer order m of the emission pattern, where m runs from 293 to 301. The gray-highlighted region indicates that $\phi$ varies over 30 degrees when the wavelength $\lambda$ is varied over the free spectral range of the grating (FSR=5.1 nm). This implies that within this $\Delta\phi$=30 degrees there is a one-to-one mapping of the wavelength $\lambda$ to the angle $\phi$, as needed for the desired single-valued scanning operation; this is also illustrated in FIG. 4c.

Along the same lines, the two-dimensional angular diffractive performance of the crossed gratings structure shown in FIG. 3a. can be analyzed. The intensity of the diffracted beam as a function of the orthogonal emission angles φ and ψ and of the wavelength λ can be derived as $$I(\varphi, \psi, \lambda) = \left|\frac{E_{tot}}{E_0}\right|^2 = \left[\frac{\sin\left(M \cdot \frac{\pi d_y}{\lambda}(\sin\psi - \sin\theta_i)\right)}{\sin\left(\frac{\pi d_y}{\lambda}(\sin\psi - \sin\theta_i)\right)}\right]^2 \cdot \left[\frac{\sin\left(N \cdot \frac{\pi}{\lambda}(d_x\sin\varphi + \Delta L_x)\right)}{\sin\left(\frac{\pi}{\lambda}(d_x\sin\varphi + \Delta L_x)\right)}\right]^2$$

where $\theta_i$ is the angle of incidence on the reflection grating 2, $d_y$ is the groove spacing of this grating and M the effective number of grooves.

Figure 5:
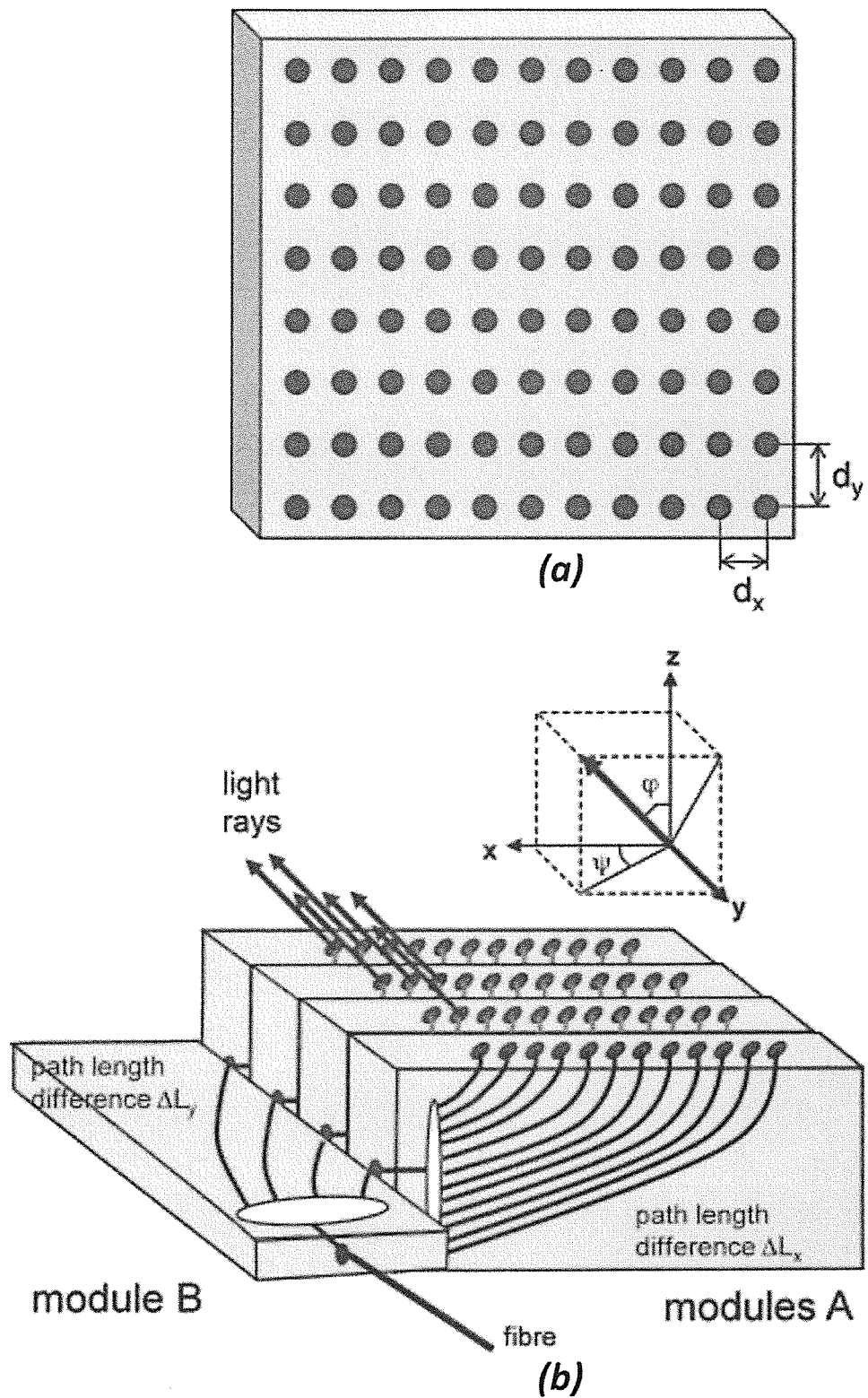
FIGS. 5a-5b show top and perspective views of an alternative embodiment of the two-dimensional diffractive module, according to the current invention.

FIGS. 5a-5b show an alternative embodiment for the two-dimensional diffractive module. It is composed of a two-dimensional array of emitters, as shown in FIG. 5a. These emitters are spaced in the x-direction by a distance $d_x$, and in the y-direction by a distance $d_y$. The intensity of the diffracted beam as a function of the emission angles φ and ψ and the wavelength λ can be derived to be $$I(\varphi, \psi, \lambda) = \frac{|E_{tot}(\varphi, \psi, \lambda)|^2}{|E_0|^2} = \left(\frac{\sin\left(\frac{M\pi}{\lambda}\{\Delta x \cdot \sin\psi\sin\varphi + \Delta L_x\}\right)}{\sin\left(\frac{\pi}{\lambda}\{\Delta x \cdot \sin\psi\sin\varphi + \Delta L_x\}\right)}\right)^2 \cdot \left(\frac{\sin\left(\frac{N\pi}{\lambda}\{\Delta y \cdot \cos\psi\sin\varphi + \Delta L_y\}\right)}{\sin\left(\frac{\pi}{\lambda}\{\Delta y \cdot \cos\psi\sin\varphi + \Delta L_y\}\right)}\right)^2$$

In analogy with the grating concept of FIG. 3b, as shown in FIG. 5b the current is realized by a number of grating modules (A) having a small free spectral range and a high angular dispersion, combined with a grating module (B) having a large free spectral range and a lower angular dispersion. Hereto in the modules (A) a relatively large differential length $\Delta L_x$ is applied yielding a small free spectral range $FSR_x$ in the x-direction, whereas in the module (B) a smaller differential length $\Delta L_y$ is applied yielding a larger free spectral range $FSR_y$ in the y-direction. The combination of this small $FSR_x$ and larger $FSR_y$ again enables the two-dimensional scanning of the far-field plane illuminated by the diffractive module by varying the wavelength λ of the light fed into the module through an optical fiber.

Figure 6:
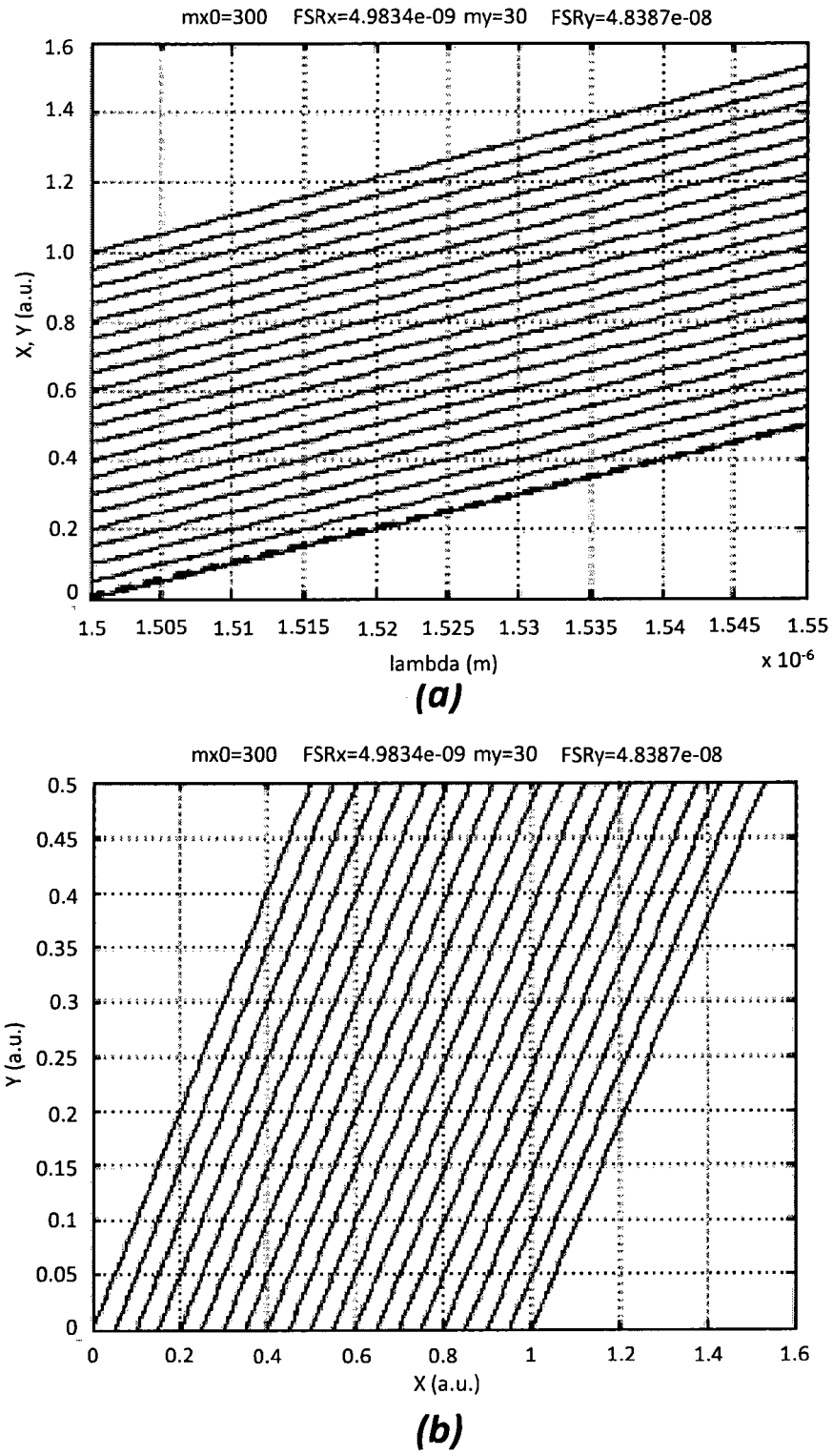
FIGS. 6a-6b show example of performance of an alternative embodiment of the two-dimensional diffractive module in a far-field plane illuminated by the module (module design: emitting array 50×50 elements, spaced by dx=30 μm and dy=3 μm, with $\Delta L_x$=450 μm and $\Delta L_y$=45 μm; wavelength λ is varied from 1.50 μm to 1.55 μm), according to the current invention.

FIGS. 6a-6b show an example of the two-dimensional dispersive performance of this two-dimensional emitter array structure. This performance has been calculated assuming that the structure has a matrix of 50×50 emitter points, spaced by dx=30 μm and dy=3 μm, with $\Delta L_x$=450 μm and $\Delta L_y$=45 μm. Similar to the intensity profile shown in FIG. 4a, the structure emits a narrow light beam which is two-dimensionally confined. FIG. 6a shows how the x- and y-coordinates of the maximum of the beam are varied when the wavelength λ is varied from 1.50 μm to 1.55 μm. The x-coordinates (red lines in the graph) have multiple orders due to the small $FSR_x$, and the y-coordinates (blue line in the graph) has a single order as the $FSR_y$ matches the wavelength scanning range. FIG. 6B shows how the intensity maxima are scanned over the (x, y) far-field plane when the wavelength λ is varied from 1.50 μm to 1.55 μm, illustrating the two-dimensional scanning capability of the two-dimensional emitter array structure while only a single parameter (i.e. the wavelength λ) is varied.

At the user terminal, a two-dimensional array of photodiodes plus a light collecting optical lens system is deployed, according to one embodiment. Thus the optical beam diameter can be substantially larger (a few cm) than the small area of a fast photodiode. Applying a photodiode array followed by individual closely-matched high-frequency amplifiers yields a high-speed photoreceiver with yet a large aperture. This approach allows one to work with beam diameters that are large enough not to require an unattainable high resolution of the wavelength tuning in the laser diodes.

Figure 7:
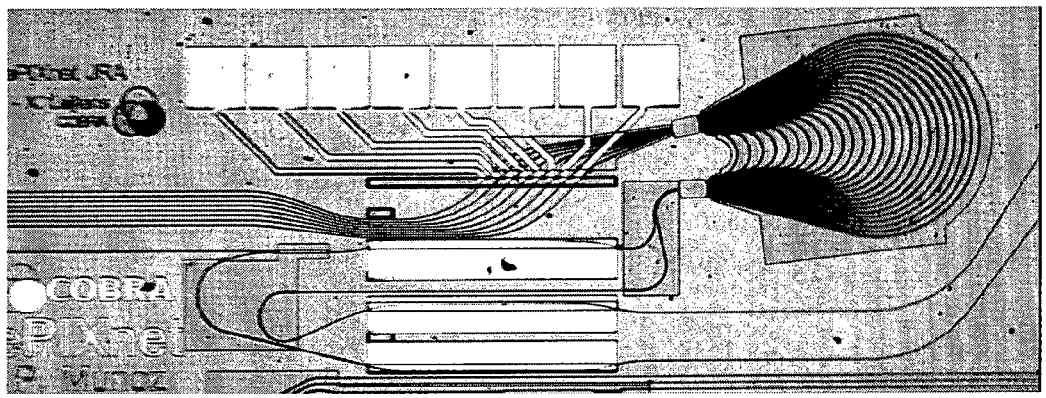
FIG. 7 shows a fast (e.g. within a few ns) wavelength-tunable laser based on an arrayed waveguide grating (AWG) and switchable SOA gates, according to one embodiment of the invention.

In one embodiment of the invention, a fast (within a few ns) wavelength-tunable laser based on an arrayed waveguide grating (AWG) and switchable SOA gates may be used, as show in FIG. 7. This device has been realized by monolithic integration using indium-phosphide to material processing technologies in the clean room laboratories. Using these technologies, also the structure of the planar AWG devices of FIG. 3b and FIG. 5b are realized. Moreover, the wavelength-tunable transmitters, deploying tunable laser diodes are implemented. Together with the routing nodes, the beam steering modules are integrated in the overall system.

Active optical devices such as the wavelength-tunable laser diodes are to be located in the CCC, from where the fiber backbone network feeds the individual wavelength channels to the respective passive PRAs. In the various branching nodes of the network, the channels have to be routed towards these PRAs. The network may include multiple fibers put in parallel into ducts, from which each fiber is led to a specific PRA.

A more efficient use of the network resources can be obtained when the capacity, generated by the multiple laser diodes in the CCC, is dynamically routed upon demand to those PRAs, which are in the vicinity of a user that requests service delivery. Following this approach, the signal routing is provided in a signal-format transparent optical crossconnect, located in the CCC, from where fiber bundles or multicore fibers run to the PRA-s (see FIG. 2), according to one embodiment. The service requests from the user need to be brought upstream from the PRA via the fiber network to the CCC, and the CCC subsequently is able to control the optical crossconnect. For the fiber backbone, bend-insensitive single-mode fiber, and preferably multimode silica or plastic fiber may be used, according to one embodiment. Multimode fiber can carry higher light powers, and thus better support the radiation of the pencil beams from the PRA. The crossconnect routes each wavelength-tuned data signal to the right PRA, upon control by the autonomic management system. This controlled routing requires adjustable optical paths in the crossconnect, compatible with the multimode fiber backbone network. In one embodiment micro-electro-mechanical systems (MEMS) mirrors, liquid crystal devices, and similar may be used. The signal wavelength can vary within a certain range; its actual value depends on the required angular diffraction in the PRA. Hence the routing functions in the crossconnect need to operate on wavelength bands fitting these ranges. Moreover, the crossconnect needs to have adequate interfaces to be controlled by the autonomic management system.

The upstream communication from the user is sent wirelessly by advanced radio techniques, for example the upstream communication uses radio-over-fiber (RoF) techniques, which are able to, handle a wide variety of radio signals. Moreover, when impulse radio ultra-wideband techniques and/or MLS spread-spectrum techniques are used in order to enable accurate localization of the user's devices, it is important that the phase and amplitude relations between the radio signals picked up at the various antenna elements are carefully maintained. These antenna elements are located close to a PRA; they receive the upstream radio signals from the user's devices, and by means of a radio-over-fiber module convert these signals to optical signals, which are carried over the fiber network to the CCC. According to one embodiment, dispersion-robust techniques for carrying microwave radio signals over (multimode silica and polymer) optical fiber are used and are tailored for the specific demands of the system of the current invention. Powering of the RoF units at the PRA is to be provided optically from the CCC via the fiber network, feeding the low-power electronics by means of photovoltaic conversion.

As the user's devices are mobile, the system is able to localize them autonomously, get information about their characteristics, and steer the optical pencil beams accurately in their direction. In order to secure eye safety a wavelength above 1400 nm is applied, while the optical pencil beams will only be activated upon command by the autonomic management control system after the devices have been localized and the autonomic management system has been assured that no user is at risk within the optical beam steering area.

According to one embodiment, in the start-up phase of pinpointing the optical pencil beam, the beam width may be temporarily enlarged; this will speed up the search process. This is combined with a simultaneous reduction of the data rate to allow for a reliable discovery and connection. Once the receiver has been found and the low data rate connection is established, the beam width is reduced and the direction of the beam adjusted until the optimum beam width has been reached and the desired ultra-high data rate is restored. The beam dynamic defocusing can be achieved in several ways; e.g., by employing a fast frequency modulation of the laser (wavelength dithering) to yield broadening of the optical beam through the dual grating structure in the PRA. The search process can be speeded up further if the control system maintains a coarse (accuracy in the order of 10 cm) relative position map of the devices with respect to radio beacons created by the antenna elements in the rooms. In this way a blind search is avoided.

Figure 8:
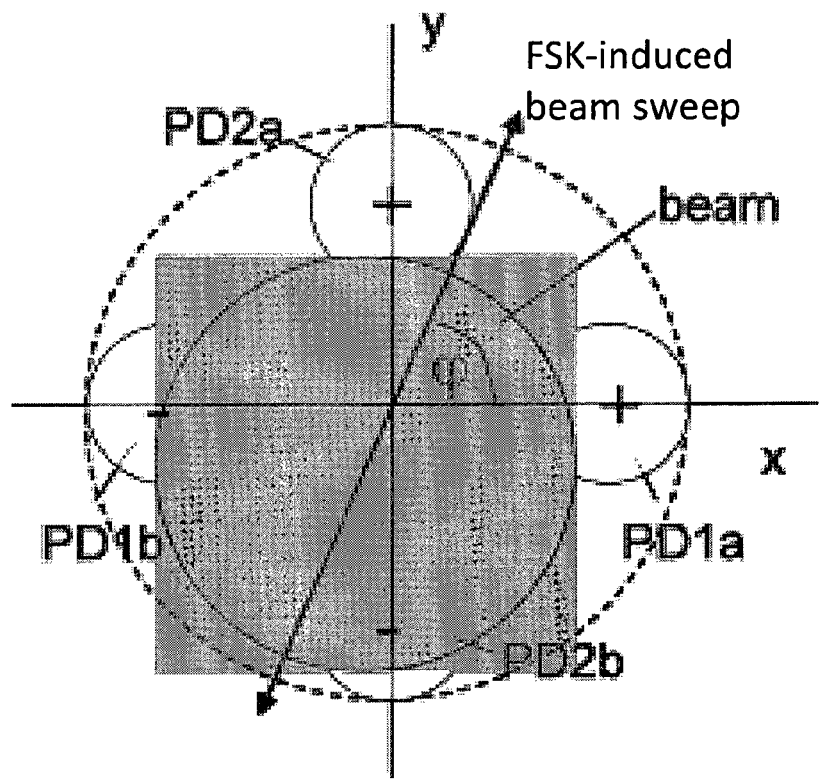
FIG. 8 shows a 2D array of photodiodes, enabling differential detection (x+y)-signal: (PD1a−PD1b)+(PD2a−PD2b); (x−y)-signal: (PD2a−PD1b)−(PD1a−PD2b), according to one embodiment of the invention.

Sensing the correctness of the direction of the optical beam can be achieved by detecting the position of the light spot relative to the photodiodes in the receiver. For this purpose, a 2D array of photodiodes may be used, e.g. in a setup as shown in FIG. 8 (combination of a central photodiode with four peripheral photodiodes). This structure can be used to detect intensity-modulated data, or frequency-modulated (using Frequency Shift Keying, FSK) data through differential detection (FSK modulation induces small movements of the beam, due to the diffraction in the PRA). FSK modulation allows differential detection, which suppresses interference from ambient light influences. Simulations have shown that an adequate control signal is obtained under all positions of the detector with respect to the sweep direction $\phi$. The differential control signals are transmitted upwards via the radio return channel and processed in the CCC. To reduce undesired interaction between the data modulation and the beam direction control mechanism, a DC-free coding for the data is required.

In another embodiment, additional solutions to the localization and blocking problems are addressed using radio links that can simultaneously provide a data connection at the fall-back rate of the optical link and location information that are used to aid in searching for the optimum direction of the optical beam. By choosing the data rate to be consistent with the fall-back rate of the optical link, the radio link can operate transparently as a fall-back connection when the optical link has not yet been established and/or when the optical path is blocked.

The radio link operates at high data rates to be compatible with the fall-back mode of the optical system. Therefore, a large bandwidth is used and as a consequence a high carrier frequency is implemented. In one example, for a fall-back rate of 10 Gbps both the 60 GHz and 90 GHz frequency bands are implemented. The radio link at these frequencies uses phased-array and/or MIMO technologies to achieve the desired data rate; the multiple small radio antennas needed can be co-located with the multiple PRA-s in the room. Various modulation methods can be used that include UWB impulse-radio and wideband multi-level FSK. The modulation for the radio link is translated to/from the optical fiber signal (radio-over-fiber), with a minimum impact on the higher layers of the communication stack. Especially the interaction with the MAC layer (and with any equalization in the optical path) is considered. Also the impact of performance differences (such as phase noise) between the optical path and the radio link on the total communication stack are addressed, where the radio link is optimized to achieve sufficient compatibility with the optical link.

For the device localization, existing UWB transceiver technologies in the 3-10 GHz range and radio beam steering techniques in the 60 GHz range and above cannot provide sufficient accuracy, especially not in the in-home environment with multipath reflections. Location information from the upstream radio link can be obtained from the multiple antenna elements located at the respective multiple PRAs, where these are also required for the optical MIMO, in order to counteract obstruction of an optical beam. The information can be obtained through (differential) time of arrival and angle of arrival localization methods. Optimization of the localization technique depends on the selected modulation method.

Correlation techniques using Maximum Length Sequences (MLS), which are quite distortion-independent, can be used. An accuracy in the order of a decimeter is achievable, and a positioning system in which each terminal transmits a radio spread-spectrum signal that includes a unique maximum length sequence (MLS) is provided. The MLS polynomial is acquired by the terminal in an initialization procedure when the terminal enters the system for the first time. The MLS-signals are detected by the radio receivers in the PRAs and sent to the CCC via the fiber backbone using Radio-over-Fiber techniques. The CCC correlates these sequences and determines the path difference of the terminal(s) with respect to the known positions of the PRAs, while correcting for the known path differences in the fiber-optic connections. The signals are not impaired by the upstream radio-over-fiber transport to the CCC, by use of the radio-over-fiber system design according to one embodiment of the current invention. Because of the spectral spreading, the MLS-signal can be transmitted at ultra-low power levels that do not interfere with normal radio communication. The coarse position information is logged in the CCC, which maintains a dynamic map of the devices and can calculate the relative position with respect to the most appropriate PRA, pinpoint the (defocused) optical beam to the coarse position of the device and starts to communicate via a low bit rate control channel in order to get a feedback signal to steer the narrowing of the optical beam. Because all the signal processing for the positioning is done in the CCC, the power consumption of the mobile terminals is reduced to a bare minimum.

Figure 9:
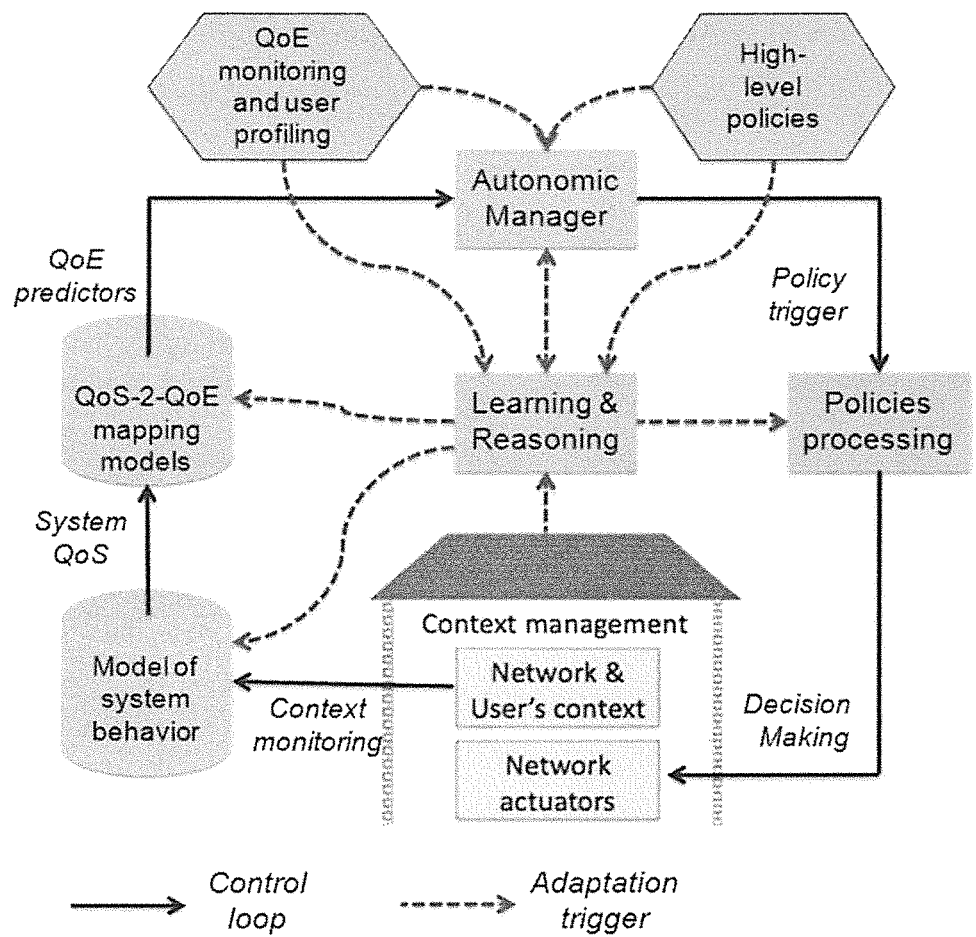
FIG. 9 shows the main components of Central Communication Controller (CCC), according to one embodiment of the invention.

Because the current invention has stringent requirements on the management and control system, a Central Communication Controller (CCC) autonomic network management control system is provided. The CCC combines cognitive monitoring techniques with semantic modeling of resources, policy-based management with fuzzy logic, and user quality of experience (QoE) management with machine learning. FIG. 9 shows the main components of the CCC.

The employment of nested control loops within the main autonomic control process represents a revolutionary approach in management. According to one embodiment, a system without separation between network, service, application and user management is provided. The autonomic manager addresses the problems of monitoring and controlling the overall context.

In one embodiment, most components are in fact influenced by the core 'learning and reasoning' component. In this way, the system is able to improve, evolve and continuously adapt the control intelligence—i.e., the autonomic manager—based on historical observation of the system performance, user's QoE, user's profiling and behavioral patterns, etc. Machine learning techniques perform data fusion, make sense of raw data, and correlate network, user and application conditions for the purposes of self-government, self-optimisation, and self-healing. System responsiveness must also be accompanied by stability, where fuzzy logic performs rule-based operations and can take into account multiple, heterogeneous factors. Furthermore, machine learning provides an advanced statistical framework for the realization of the necessary self-learning mechanisms that allow the system to prevent or early-detect unwanted conditions (e.g. instability) based on past observations.

Gathering and aggregating (in real-time) physical-layer information, specifically from the radio localization component (for user localization and tracking), from the fiber network (network monitoring, resource utilization and load balancing) and from the optical beam steering devices (2-dimensional angular beam steering) is provided. Managing and, particularly, controlling those resources in an autonomic fashion requires the system to acquire further contextual information. The terminal capability (both hardware and software) in terms of networking, mobility support, storage, security and service requirements is a dynamic, multi-dimensional vector, which directly influences the operation and optimization of the overall network. In order to determine the best control action, one embodiment of the current invention is an evolvable, semantic model of the system behavior. Here, monitored data is matched against this model to determine the real-time status of the system's quality of service (QoS).

The control actions elaborated by the autonomic controller are eventually turned into physical-layer operations. First, the optical beam generator is selected that is utilized at any given moment and proactively hands over among different ones to prevent channel impairments. Based on user tracking information, but also on his/her historical behavioral and mobility patterns, the two angular dimensions of the optical beam are steered. In order to secure eye safety, the optical beam will not be activated by the autonomic management system before the device has been successfully localized and the system has been assured that no user is at risk within the beam steering realm. Accurate predictions of the user's future positions will improve the effectiveness of these control and actuation operations. At the same time, information collected from the user, session and data planes are used to optimize the process of signal routing in the optical crossconnect, according to the fundamental concept of application-aware networking.

Although the physical-layer context (QoS) is acted upon, the ultimate goal is to control quality-of-experience (QoE), i.e. the level of service as it is perceived by the user. From state-of-the-art perceptual studies, ways to build QoS-to-QoE mapping models are known. Using such models, predictions regarding the impact of the current level of QoS onto QoE are extrapolated, which help the autonomic manager to determine the best course of action.

It should be emphasized that both the system behavioral and the QoS-to-QoE mapping models are not static. They are continuously refined and evolved by means of the 'learning and reasoning' component (dotted lines in FIG. 9). In a further embodiment, the current invention uses machine learning to automatically deduce whether a given service is perceived as 'satisfactory' by the user. Then this estimate is correlated with the overall contextual state (network, terminal, etc.) and statistical techniques are used to determine whether the existing model needs adjustments. With the number of observations the accuracy of the model increases and, with that, the system controllability.

In turn, the 'autonomic management' component is influenced by QoE monitoring information as well as by a set of high-level policies (or management) goals. Policy-based management provides the way to prevent, detect and handle conflicting conditions among the various entities (networks, terminals, user preferences, etc.). A major problem arising when one tries to automate the management of complex systems (such as the one under study), is that conflicting conditions demand for human intervention. A network configuration action that would increase throughput (e.g. forcing a handover from a lower-capacity mobile wireless standard to a higher-capacity one; cf. from UTMS to WiFi) might result in session disruption when the decision-making system does not have sufficient information about the context (network and terminal capability; e.g. if the user's terminal does not support WiFi). Policy-based management is ideal to prevent, detect or resolve such conflicts. Furthermore, when new conflicting situations do arise, the 'learning' system generates preventive actions by introducing new policies.

At the very first service activation, the 'autonomic manager' relies on existing models, service profiles and policies, which most probably leads to sub-optimal control actions. Being aware of this risk, the controller performs smooth operations in order to minimize instability. The 'learning' component uses QoE monitoring data to reason about the new service and starts refining mapping models and policies, iteratively. The behavior of the autonomic manager changes over time, for instance when a new service/application is instantiated, when the user switches over to a new terminal, or when a new user connects.

Machine learning techniques provide the autonomic controller with the necessary information:
1. statistical correlations among the different factors and layers (network, application, user) involved,
2. sensitivity of each parameter to one another,
3. predictions of the impact that specific control actions (on the network) will have onto the user's QoE,
4. policy refinement and adaptation,
5. ultimately, the level of responsiveness, performance and stability required in the project.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. All such variations are considered to be within the scope and spirit of the present invention as defined by the following claims and their legal equivalents.

What is claimed:

1. An ultra-high capacity interference-free communication system, comprising:
   a. a central communication controller (CCC), wherein said CCC comprises a wavelength-tunable light source, wherein said wavelength-tunable light source emits an optical data signal, wherein said optical data signal comprises a tunable wavelength, wherein said CCC controls said wavelength-tunable light source, wherein said control of said wavelength-tunable light source comprises conditioning, modulation and wavelength-tuning of said optical data signal, wherein said CCC comprises a signal-transparent optical crossconnect;
   b. a fiber optic network, wherein said wavelength-tunable light source is coupled to said fiber optic network;
   c. a pencil-radiating antenna (PRA), wherein said PRA comprises a passive 2-dimensional diffractive module, wherein said PRA is coupled to said fiber optic network, wherein said PRA is coupled to said wavelength-tunable light source via said fiber optic network, wherein said signal-transparent optical crossconnect routes said optical data signal to said PRA, wherein said optical data signal is transmitted through a confined optical pencil beam, wherein said PRA deflects said confined optical pencil beam in 2 angular dimensions as a function of a wavelength of said confined optical pencil beam, wherein said deflected optical pencil beam is disposed for communication with an opto-electronic communication device; and
   d. a radio return channel, wherein said radio return channel comprises upstream data communication when a connection with said opto-electronic communication device has been established and alternatively comprises a lack-of-connection communication between said opto-electronic communication device and said CCC in order to support a localization of said electronic communication device and steering of said optical pencil beam.

2. The interference-free communication system of claim 1, wherein said radio return channel provides radio-over-fiber communication by a radio-over-fiber unit.

3. The interference-free communication system of claim 2, wherein said radio-over-fiber unit is powered through said PRA according to a photovoltaic conversion device.

4. The interference-free communication system of claim 1, wherein each optical data signal is transmitted by a unique wavelength, wherein said unique wavelength comprises an independent communication path from said CCC to an opto-electronic communication device.

5. The interference-free communication system of claim 1, wherein said optical pencil beam comprises an eye-safe wavelength.

6. The interference-free communication system of claim 1, wherein said opto-electronic communication device comprises a photodetector.

7. The interference-free communication system of claim 6, wherein said photodetector comprises a 2-dimensional photodetector array and a light collecting lens system.

8. The interference-free communication system of claim 1, wherein said PRA comprises two consecutive orthogonal diffractive stages, wherein in a first diffractive stage said optical pencil beam is diffracted in one angular direction $\phi$ as a periodic relatively fast-varying function of the wavelength $\lambda$, wherein in a second diffractive stage said optical pencil beam is diffracted in a second angular direction $\psi$ as a relatively slowly-varying function of $\lambda$, wherein said angular direction $\psi$ is orthogonal to said angular direction $\phi$.

9. The interference-free communication system of claim 1, wherein said 2-dimensional diffractive module comprises two crossed diffraction gratings with different grating pitches, wherein a first said diffractive grating comprises a relatively high angular dispersion $d\phi/d\lambda$, and relatively small $\Delta\lambda_{FSR}$.

10. The interference-free communication system of claim 9, wherein said 2-dimensional diffractive module comprises an array of said 2-dimensional diffractive modules.

11. The interference-free communication system of claim 1, wherein said CCC comprises an autonomic management system, wherein said autonomic management system activates said optical pencil beam upon demand from said electronic communication device, wherein said autonomic management system assures that a user is not at risk of eye damage from said optical pencil beam within an optical beam steering area.

12. The interference-free communication system of claim 11, wherein said autonomic management system comprises modules selected from the group consisting of beam steering control, control of signal routing by optical crossconnecting, context monitoring, and policy-based management and control system.

13. The interference-free communication system of claim 1, wherein at a start-up of locating said optical pencil beam to said opto-electronic communication device a width of said optical pencil beam is enlarged by a wavelength dithering unit in said CCC, wherein said widened optical pencil beam is reduced upon an established connection.

* * * * *